United States Patent [19]
Sihvonen

[11] 3,834,032
[45] Sept. 10, 1974

[54] APPARATUS FOR MEASURING ROUNDNESS, CONCENTRICITY, FLATNESS AND AXIS SQUARENESS

[75] Inventor: Kauno E. Sihvonen, Arcadia, Calif.

[73] Assignee: Gould, Inc., Cleveland, Ohio

[22] Filed: June 21, 1972

[21] Appl. No.: 264,719

[52] U.S. Cl............ 33/174 TD, 33/174 TA, 74/221, 308/73
[51] Int. Cl........................ G01b 5/20, G01b 5/22
[58] Field of Search..... 33/174 TA, 174 TD, 174 R; 74/221; 308/73

[56] References Cited
UNITED STATES PATENTS

| | | | |
|---|---|---|---|
| 1,814,833 | 7/1931 | Doran................................. | 308/73 |
| 2,428,142 | 9/1947 | Carter................................. | 74/221 |
| 2,578,675 | 12/1951 | Daniels............................... | 74/221 |
| 2,743,142 | 4/1956 | Balsiger............................. | 308/73 |
| 2,873,152 | 2/1959 | Thompson.......................... | 308/73 |
| 3,604,767 | 9/1971 | Decker............................... | 308/73 |

FOREIGN PATENTS OR APPLICATIONS
431,667   3/1948   Italy................................ 33/174 TD Primary Examiner—John W. Huckert
Assistant Examiner—Milton S. Gerstein
Attorney, Agent, or Firm—George J. Netter

[57] ABSTRACT

A work surface is supported at the upper end of a vertical spindle. The lower spindle end includes a conical opening within which a ball is received with portions thereof extending outwardly from the spindle end surface. A mounting base has a further conical opening provided with a low frictional seat into which the ball is also received. The upper spindle marginal end portion has a precisely formed circumferential surface such that the axis of this circumferential surface coincides with the axis through the ball center to a high degree of accuracy. Low friction pads are arranged in contacting relation to the spindle upper end circumferential surface. Tangential drive is applied to both sides of the spindle simultaneously.

9 Claims, 5 Drawing Figures

PATENTED SEP 10 1974

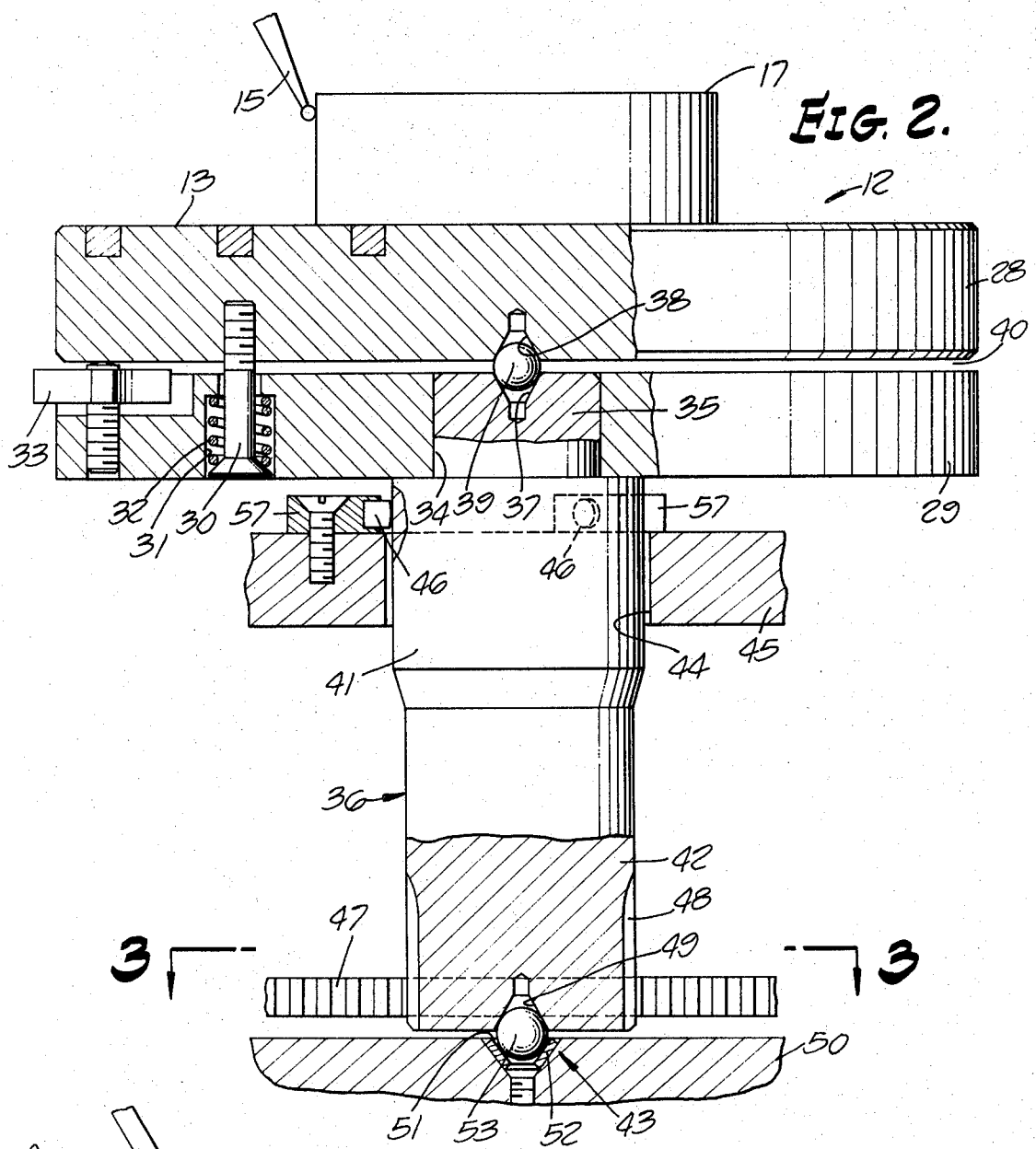
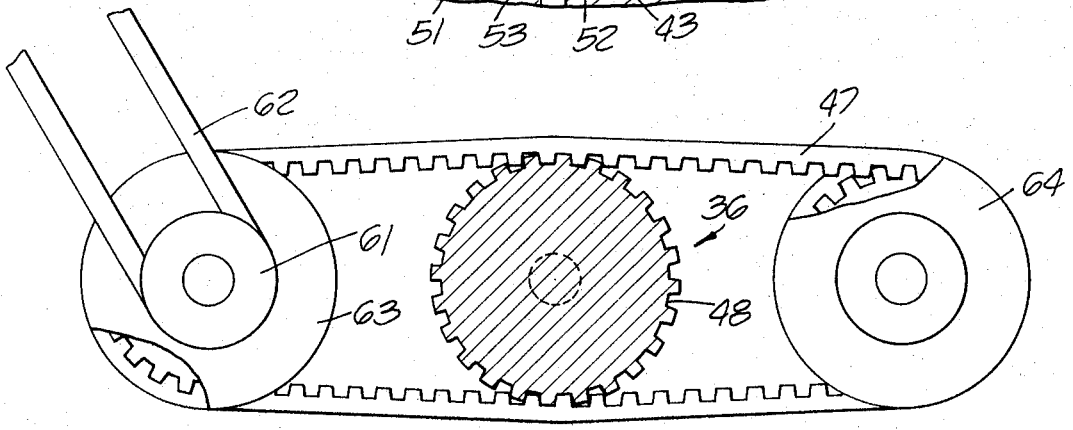

APPARATUS FOR MEASURING ROUNDNESS, CONCENTRICITY, FLATNESS AND AXIS SQUARENESS

BACKGROUND

The present invention relates generally to measuring apparatus, and, more particularly, to apparatus for measuring the surface condition of a workpiece for such characteristics as roundness, concentricity, flatness, parallelism, waviness, roughness, and axis squareness.

Known prior roundness measuring equipment have included a rotatable work surface mounted onto the end of a shaft that is supported against both radial and axial movements by low friction ball bearings. An item to be measured is positioned on the work surface where it is contacted by a probe which is electrically coupled to a pen recorder, for producing a continuous graphic record of the item surface condition. Although equipment of this construction has been found generally satisfactory for measuring surface conditions to a tolerance within the microinch range, it has been relatively expensive and complicated to manufacture. For example, the bearing races for the work surface support shaft or spindle must be very precisely constructed and at considerable cost. Moreover, past drive systems for rotating the work surface and pen recorder table have been relatively complex arrangements which also contributed considerably to the overall cost.

In another prior known type of such surface gaging equipment, the work surface or work supporting table is positionably maintained on a cushion of air. This version also operates satisfactorily, although it has at least one major disadvantage in requiring a highly filtered air supply. Moreover, the supporting air passes through small jets which, if they become plugged, can require expensive overhaul. Still further, it is inherent in the operation principle of this form of apparatus that loss of air pressure during use (under load) can result in almost instant destruction of the unit.

OBJECTS AND SUMMARY OF THE INVENTION

It is one object of the invention to provide improved workpiece surface condition gaging apparatus of a simplified yet rugged construction and which is relatively inexpensive to manufacture.

A further object is the provision of roundness measuring apparatus having a three-point bearing assembly maintaining the work surface support spindle against radial shift.

Another object is the provision of such apparatus in which the work surface spindle is supported at its lower end by a single ball received within a simplified, easily replaceable seat.

Yet another object is the provision of surface characteristics measuring apparatus as in the above objects in which the drive means exert balanced drive forces to the opposite sides of the work surface support spindle.

A further object is the provision of a driven work surface support spindle axially supported by a single ball, the accuracy of which is comparatively insensitive to ball sphericity.

In the practice of this invention a work surface or table is supported at the upper end of a vertically disposed, generally cylindrical spindle. The lower spindle end includes a conical opening within which a ball is received with portions thereof extending outwardly from the spindle end surface. A mounting base includes a conical opening provided with a soft metal or other low frictional material seat into which those portions of the ball extending from the spindle end are received. The upper spindle marginal end portion has a precisely formed circumferential surface such that the axis of this circumferential surface coincides with the axis through the ball center to a high degree of accuracy. Three soft or low friction, pressure pads or bearings are arranged in contacting relation to the spindle upper end circumferential surface.

The lower circumferential marginal end portions of the spindle are provided with a set of longitudinally extending grooves via which the spindle is rotated. More particularly, a continuous toothed belt encompasses the spindle marginal end and engages the spindle grooves simultaneously on opposite sides, providing equal tangential driving forces to opposite sides of the spindle. By this arrangement, side forces on the spindle support ball which would otherwise be produced by static belt tension in conventional drive systems, are entirely removed.

DESCRIPTION OF THE DRAWINGS

FIG. 2 is a sectional elevational, partially fragmentary view taken along line 2—2 of FIG. 1.

FIG. 3 is a plan, sectional view of the spindle drive taken along line 3—3 of FIG. 2.

DESCRIPTION OF A PREFERRED EMBODIMENT

Although it is to be noted that the apparatus to be described here can be utilized for the measurement of a number of different workpiece surface conditions, such as roundness, concentricity, flatness, parallelism, waviness, roughness, and axis squareness, for ease of presentation it will be particularly described in connection with roundness gaging.

Figure 1:
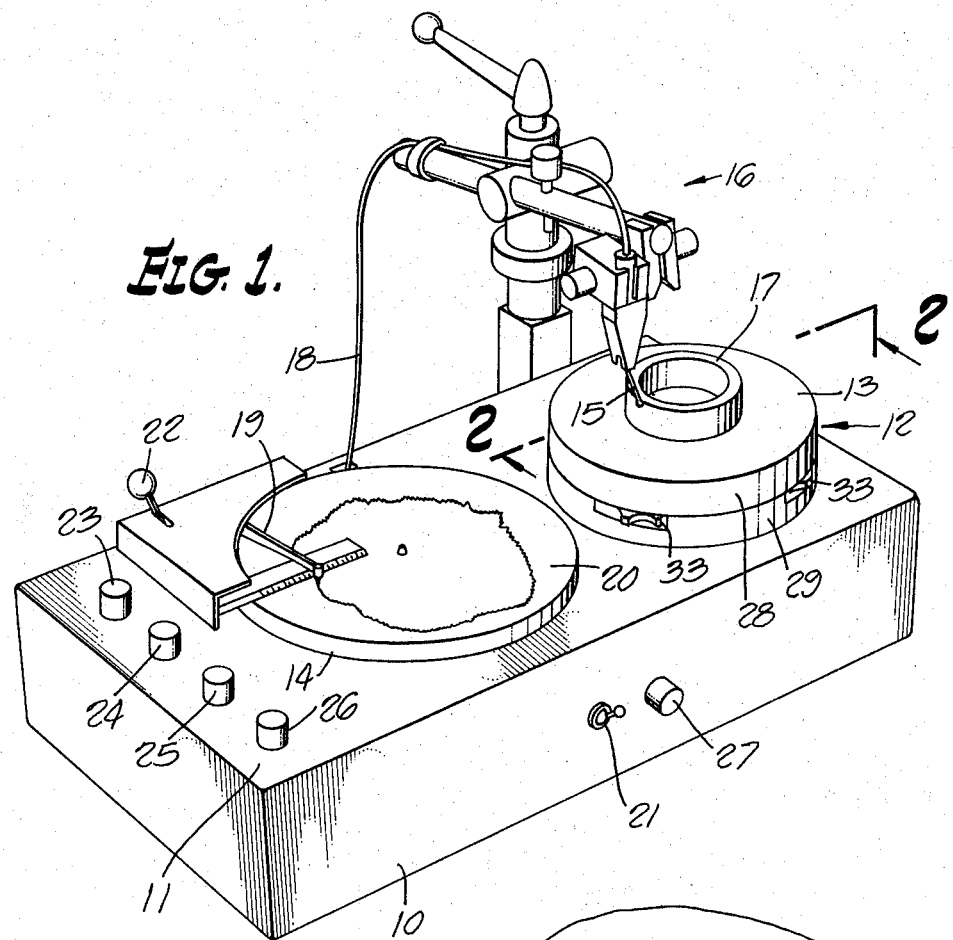
FIG. 1 is a perspective view of the surface condition measuring apparatus of this invention.

Turning now to the drawings and specifically to FIG. 1, the roundness gaging apparatus of this invention is seen to include a generally rectangular base 10 having an upper horizontal surface 11 on which there are arranged a disclike, rotatable work table 12 with a horizontal supporting surface 13 for carrying the workpiece, and a recording turntable 14 with graph paper carried thereon. The work table 12 and turntable 14 are driven in synchronism for a purpose and use to be described.

A probe 15 is positioned by the mechanism 16 in contact with the outer surface of a typical workpiece 17 which has been previously centered on the work surface 13. Although other types of workpiece may be tested by the apparatus of this invention, the workpiece depicted is a cylinder and it will be assumed that it is desired to measure its "roundness."

On rotation of the work table 12 and turntable 14, the probe 15 generates an electrical signal in a known way responsive to the position of the workpiece surface relative to the circular axis of the work supporting surface 13. The electric signals are transmitted along cable 18 to control the position of a conventional pen recording apparatus. For example, with a cylindrical workpiece 17, a graph such as the trace 20 might be obtained with the general position and waviness of the trace depicting variations in the probed workpiece surface from a true round condition. In addition, on-off switch 21, pen positioning lever 22 are various electrical control knobs 23–27 are provided.

With reference now particularly to FIG. 2, the work table 12 is seen to comprise an upper disc 28 and a lower disc 29. Resilient spacing of the upper disc to the lower disc is provided by two equally spaced bolts 30, each of which extends through an oversize opening 31 in disc 29 and a compression coil spring 32 for threaded receipt in the disc 28. Thumbscrew adjustment means 33 permit slight variations of the tilt plane of 28.

An axially aligned opening 34 fittingly receives the reduced diameter end portion 35 of a vertically oriented support and drive spindle 36. The spindle upper end surface includes an axial conical opening 37 which lies directly opposite a similar conical opening 38 in the lower surface of disc 28. A positioning ball 39 is received within each of the openings 37 and 38 and is of such dimension as to maintain the two discs 28 and 29 slightly spaced, as at 40, when they are parallel. The spindle further includes a large diameter portion 41 immediately adjacent the reduced diameter portion 35, with the remainder 42 being of a constant intermediate diameter. The spindle lower end has a single ball support assembly 43 providing both vertical support and rotatability. The large diameter portion 41 passes through oversize opening 44 in the upper wall 45 of base 10, and is sustained against radial translation by a plurality of pressure pads or bearings 46. A toothed belt 47 cooperates with a set of grooves 48 provided on the lower end portion of the spindle for rotating the spindle and work supporting table 12 as a unit.

The lower support means 43 includes a conical opening 49 formed in the lower end surface of the spindle at the center thereof, which conical opening is provided with a taper of approximately 60° for a purpose to be described. The lower wall 50 of the base 10 has a conical opening 51 of greater angular extent than opening 49, and which in a practical embodiment was approximately 75°. The walls defining the opening 49 are of the same hard material composing the spindle and are machined to a high quality finish. The opening 51, on the other hand, includes a conical seat 52 of a relatively soft metal or other low-friction material. A ball 53 is received within the opening 51 in pressure exerting relation to the low-friction seat 52 as shown in FIG. 2, and is of such dimensions that its upper portions extend outwardly of the opening 51, thereby maintaining the lower end of the spindle spaced from the wall 50. In operation, due to the fact that the wall surfaces of 49 have a relatively high friction as compared to the wall surfaces of the seat 52, the ball is immovably held in 49 and rotates within the seat 52.

The opening 49 must be accurately located on the cylindrical axis of the portion 41 in order that when the ball 53 aligns 49 with 51 the vertical support and rotational axis will lie directly along the cylindrical axis.

Figure 5:
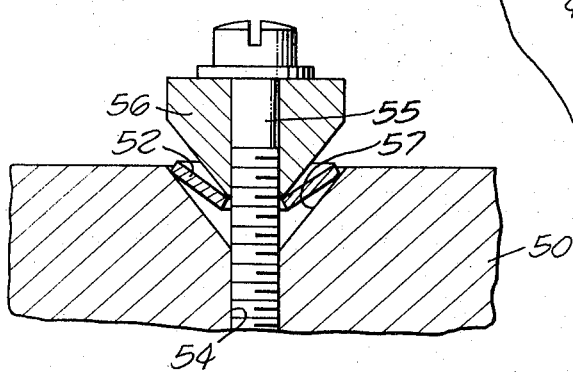
FIG. 5 is an elevational, sectional, enlarged view of the ball seat showing the means and method of producing a seat lining.

As shown in FIG. 5, the bottom of the opening 51 includes a further smaller opening 54 threaded to receive a bolt 55 for applying the seat 52 to the conical wall surfaces. Specifically, the seat 52 is provided in the conical opening 51 by locating a conventional washer of a suitable soft metal such as Babbitt, or other low friction material, onto the end of the bolt 55 which has already been provided with a conical mandrel 56 of the same general dimensions as opening 51. On threading the bolt 55 into the opening 54, mandrel 56 forces the washer into place against the walls of the opening 51 to form the seat 52.

Since the spindle 36 and work supporting table 12 are supported vertically by a single ball 53, and radially by pressure pads or bearings 46, it is important that the large diameter portion 41 be precisely formed as a true cylinder relative to the rotational axis. Any ellipticity of 41 will tend to produce a wobble or eccentric motion that will, in turn, add an unacceptably high error to readings made by the probe 15.

Figure 4:
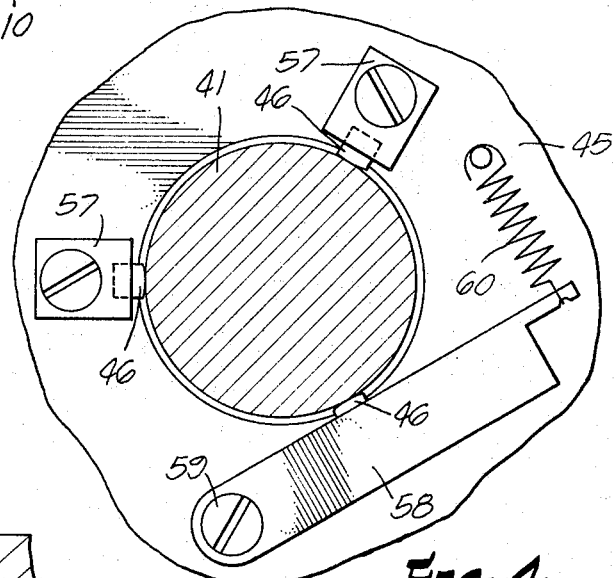
FIG. 4 is a plan, sectional view through the spindle and radial support bearings.

The pads or bearings 46 are preferably three in number, two fixed and one movable, and are located in the same horizontal plane at approximately 120° to each other (FIG. 4). Each of the fixed pads consists of a body of low friction material such as Babbitt, which is received within an accommodating opening in the wall 45 and held therein by screwed on cover means 57. The third, or movable, bearing pad 46 is affixed to the sidewall or a holder bar 58, one end of which is rotatably screwed to the wall 45 as at 59, while the other end is connected to a spring 60 which resiliently urges the bar and pad against the spindle.

Reference is now made to both FIGS. 2 and 3 and the means for applying rotative power to the spindle. A gear pulley wheel 61, driven by belt 62 connected to a suitable rotation power source such as an electric motor (not shown), is integrally related to a drive pulley 63, the latter being linked to the spindle grooves 48 and a further gear pulley 64 by the notched or toothed belt 47. It is to be noted that the pitch diameters of the gear wheels 63 and 64 are both less than that of spindle gear 48 which insures a positive belt engagement with both sides of the spindle. By driving tangentially from opposite sides, the spindle is not subjected to asymmetrical driving forces or static belt tension which could produce non-uniform loading of the bearing pads 46 and the bearing seat 52 and induce measurement errors in the entire system.

There is provided in accordance with the described apparatus means for measuring roundness to a high degree of accuracy, e.g., in the microinch range, which is rugged and relatively inexpensive to manufacture. The drive spindle is supported axially vertically on a single ball received within a low friction conical seat. Furthermore, the described apparatus does not have the disadvantages of the prior air systems such as air filtering, port clogging, and possibility of damage on sudden loss of air pressure. Moreover, the described system is less expensive than ball bearing mounted apparatus, and is not subject to shock damage such as "brinelling" of the ball bearings or the bearing races.

What is claimed is:

1. Rotatable spindle support means for a roundness measuring machine, comprising:
    a generally cylindrical body arranged with the cylindrical axis extending vertically, the upper end of which is adapted to support a work surface and the lower end surface includes a conical opening lying on the cylindrical axis, the walls defining the conical opening exhibiting a relatively high sliding friction;

a hard metal sphere received within the conical opening of said cylindrical body and having portions extending outwardly of the body lower end surface;

a generally horizontal base plate having a conical opening therein facing upwardly within which opening those portions of the metal sphere extending outwardly of the cylindrical body are received;

means lining the walls defining the base plate conical opening constructed of a material softer than the metal sphere and which material forms a relatively low sliding friction with said sphere, such that on rotation of the cylindrical body the sphere moves with said body and moves relative to said lining means; and a plurality of low friction pads lying within substantially the same horizontal plane and contacting the cylindrical body circumferential surface at mutually spaced areas.

2. Rotatable spindle support means as in claim 1, in which the base plate opening lining means includes a soft metal seat.

3. Rotatable spindle support means as in claim 1, in which the base plate opening lining means includes a soft metal lining, said lining and said low friction pads being constructed of the metal alloy Babbitt.

4. Rotatable spindle support means as in claim 1, in which one of said low friction pads is spring-loaded so as to be resiliently urged against the cylindrical body.

5. Apparatus for providing support and rotative drive to a work table in a roundness measuring machine, comprising:
   an elongated body member disposed in generally vertical orientation and having its upper end secured to said work table;
   a horizontal surface having relatively soft metal walls defining a conical opening therein that faces upwardly;
   a hard metal ball received within the horizontal surface conical opening and of such relative dimensions as to extend outwardly of said opening beyond the horizontal surface when fully seated therein;
   that part of said metal ball extending above the horizontal surface being received within an axially located opening in the lower end surface of said body member, and frictionally secured within said opening for rotation with said body member while sliding across said conical opening soft metal walls;
   an extent of the elongated member formed into a cylinder with the cylindrical axis passing through the ball center;
   low friction pad means in bearing contact with the cylindrical portion of said elongated body member; and
   means for applying oppositely directed tangential rotative forces simultaneously to opposite sides of said elongated member.

6. Apparatus as in claim 5, in which the opening in said elongated body is conical and has an angular extent of approximately 60° and the opening in said horizontal surface has an angular extent of approximately 75°.

7. Apparatus as in claim 5, in which the elongated body member includes a further cylindrical portion having longitudinally extending grooves; and said means for applying rotative forces includes a driven continuous belt having transverse grooves which simultaneously engage the body member grooves on opposite sides of said member.

8. Apparatus as in claim 5, in which the conical opening soft metal walls in said horizontal surface a flat annular washer of a low friction, soft metal deformed into intimate contacting relation with said conical opening walls.

9. Apparatus as in claim 3, in which said low friction pad means includes a pair of soft metal bodies fixedly located with respect to said elongated body member and a third soft metal body being resiliently urged against said body member, said soft metal bodies being arranged at approximately 120° apart around said elongated body member.

* * * * *